(12) United States Patent
Kamiyama et al.

(10) Patent No.: US 7,506,895 B2
(45) Date of Patent: Mar. 24, 2009

(54) SEGMENT FOR A REHABILITATING PIPE

(75) Inventors: Takao Kamiyama, Hiratsuka (JP); Koji Kaneta, Hiratsuka (JP); Kenji Fujii, Hiratsuka (JP); Makoto Ishida, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 501 days.

(21) Appl. No.: 11/058,947

(22) Filed: Feb. 16, 2005

(65) Prior Publication Data

US 2005/0229986 A1  Oct. 20, 2005

(30) Foreign Application Priority Data

Apr. 19, 2004 (JP) ............... 2004-122472

(51) Int. Cl.
*F16L 55/18* (2006.01)

(52) U.S. Cl. ............... 285/15; 285/419; 138/97; 405/184.1; 405/184.2

(58) Field of Classification Search ............. 285/15–17, 285/12, 411–412, 419, 373; 138/97–98; 405/184.1, 184.2
See application file for complete search history.

(56) References Cited

U.S. PATENT DOCUMENTS

| | | | | |
|---|---|---|---|---|
| 400,262 A * | 3/1889 | Smith | .................. | 138/100 |
| 427,658 A * | 5/1890 | Bayles | .................. | 285/405 |
| 558,436 A * | 4/1896 | Thomas | .................. | 405/153 |
| 780,152 A * | 1/1905 | Boyd | .................. | 138/159 |
| 875,304 A * | 12/1907 | Wilkening | .................. | 285/64 |
| 1,003,759 A * | 9/1911 | Lauritzen | .................. | 138/162 |
| 1,197,140 A * | 9/1916 | Mathews | .................. | 138/157 |
| 1,329,522 A * | 2/1920 | Griffin | .................. | 137/15.08 |
| 1,898,380 A * | 2/1933 | Meier | .................. | 52/271 |
| 2,002,987 A * | 5/1935 | Schulz | .................. | 405/153 |
| 2,005,699 A * | 6/1935 | Gottwald | .................. | 285/61 |
| 2,215,318 A * | 9/1940 | Bristol | .................. | 285/148.22 |
| 4,105,051 A * | 8/1978 | Visentin | .................. | 138/162 |
| 4,130,300 A * | 12/1978 | Sheridan | .................. | 285/16 |
| 4,397,583 A * | 8/1983 | Horncy et al. | .................. | 405/150.1 |
| 4,429,907 A * | 2/1984 | Timmons | .................. | 285/373 |
| 4,545,701 A * | 10/1985 | Tsuzuki | .................. | 405/153 |
| 4,950,000 A * | 8/1990 | Richardson | .................. | 285/15 |
| 5,927,346 A * | 7/1999 | Majnaric et al. | .................. | 138/175 |
| 5,928,447 A * | 7/1999 | GianFrancisco | .................. | 156/94 |
| 7,017,613 B2 * | 3/2006 | Miura et al. | .................. | 138/98 |
| 7,083,360 B2 * | 8/2006 | Kamiyama et al. | .................. | 405/184.1 |
| 7,156,124 B2 * | 1/2007 | Kamiyama et al. | .................. | 138/98 |
| 7,165,578 B2 * | 1/2007 | Kamiyama et al. | .................. | 138/98 |
| 2005/0236059 A1 * | 10/2005 | Kamiyama et al. | .................. | 138/98 |
| 2005/0252565 A1 * | 11/2005 | Kamiyama et al. | .................. | 138/98 |
| 2006/0001258 A1 * | 1/2006 | Kamiyama et al. | .................. | 285/15 |

* cited by examiner

*Primary Examiner*—James M Hewitt
(74) *Attorney, Agent, or Firm*—Adams & Wilks (57) ABSTRACT

A segment is coupled to another segment in circumferential and longitudinal directions thereof to assemble a rehabilitating pipe for rehabilitating the existing pipe. Each of the coupled segments has at least one coupling surface provided with a recessed part that confronts the recessed part at the coupling surface of the segment to which it is coupled to form therebetween a gap that is configured to receive and hold waste material existing at a bottom surface of the existing pipe when the rehabilitating pipe is assembled inside of the existing pipe.

20 Claims, 7 Drawing Sheets

SEGMENT FOR A REHABILITATING PIPE

BACKGROUND OF THE INVENTION

1. Field of the Invention

The present invention relates to a segment adapted for use for a rehabilitating pipe that is assembled to rehabilitate an existing pipe, such as a sewer pipe.

2. Description of the Prior Art

Figure 5:
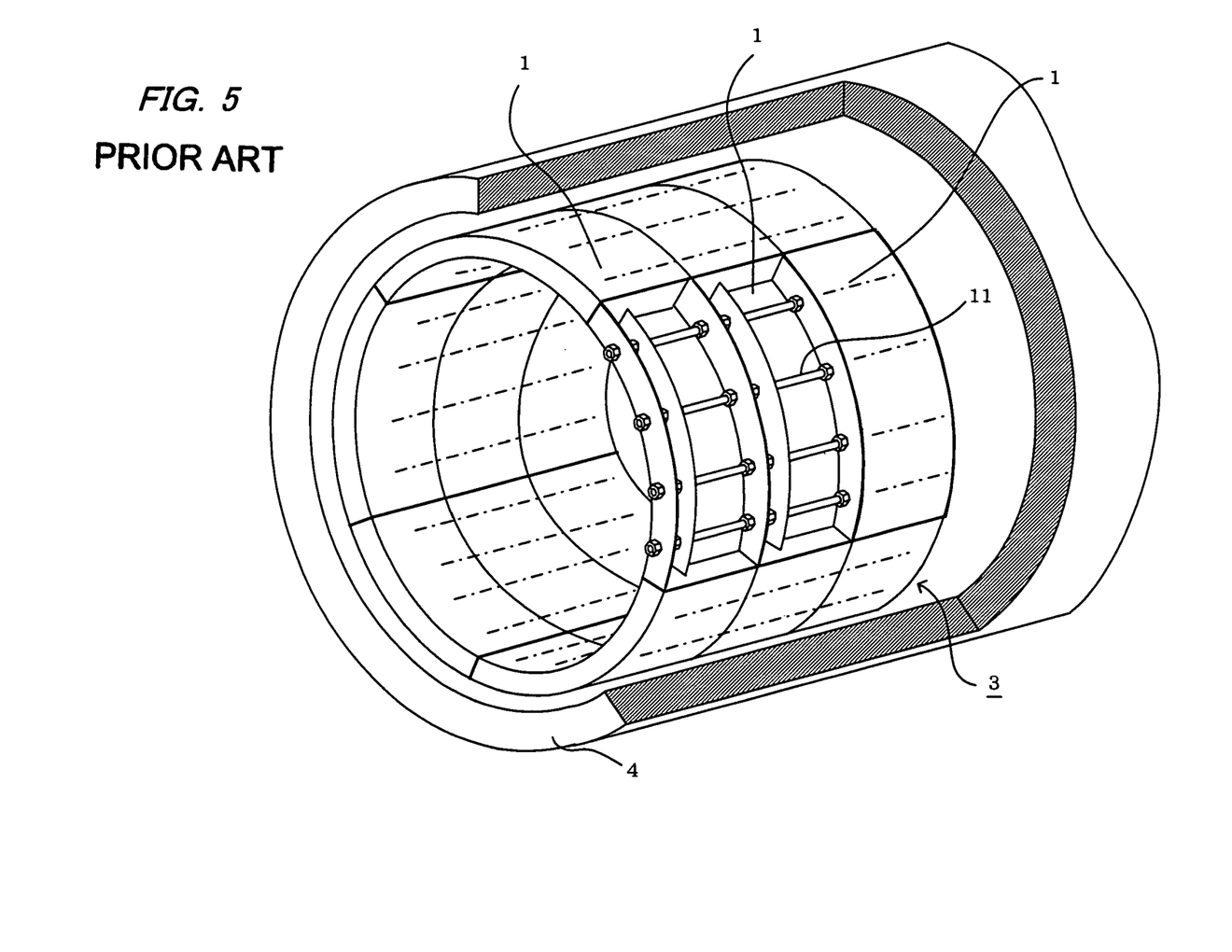
FIG. 5 is a partially broken perspective view showing a state wherein the segments are coupled to assemble a rehabilitating pipe inside the existing pipe.

A method of rehabilitating an existing pipe is known from Japanese Patent Laid Open Publication No. 2003-286742 and the like, wherein a compound pipe is constructed to rehabilitate an existing pipe, such as a sewer pipe, as shown in FIG. 5, by assembling and laying inside an existing pipe 4 a rehabilitating pipe 3 whose outer diameter is slightly less than the inner diameter of the existing pipe, and then filling and hardening a filler in the gap between the outer circumference of the rehabilitating pipe 3 and the inner wall surface of the existing pipe 4. If the rehabilitating pipe 3 is a circular pipe whose diameter is approximately 1,000-1,800 mm, the rehabilitating pipe 3 is assembled by forming short rings by coupling a plurality of segments 1 in the circumferential direction of the rehabilitating pipe 3, and then successively and mutually coupling the rings in the longitudinal direction of the rehabilitating pipe 3 (ring assembly). Since ring assembly is problematic for the case wherein the rehabilitating pipe 3 has a large diameter of approximately 2,000 mm or greater or is a rectangular pipe, the rehabilitating pipe 3 is assembled by successively coupling the segments 1 in units, one by one, in the circumferential direction and the longitudinal direction of the rehabilitating pipe 3 (unit assembly).

Figure 7:
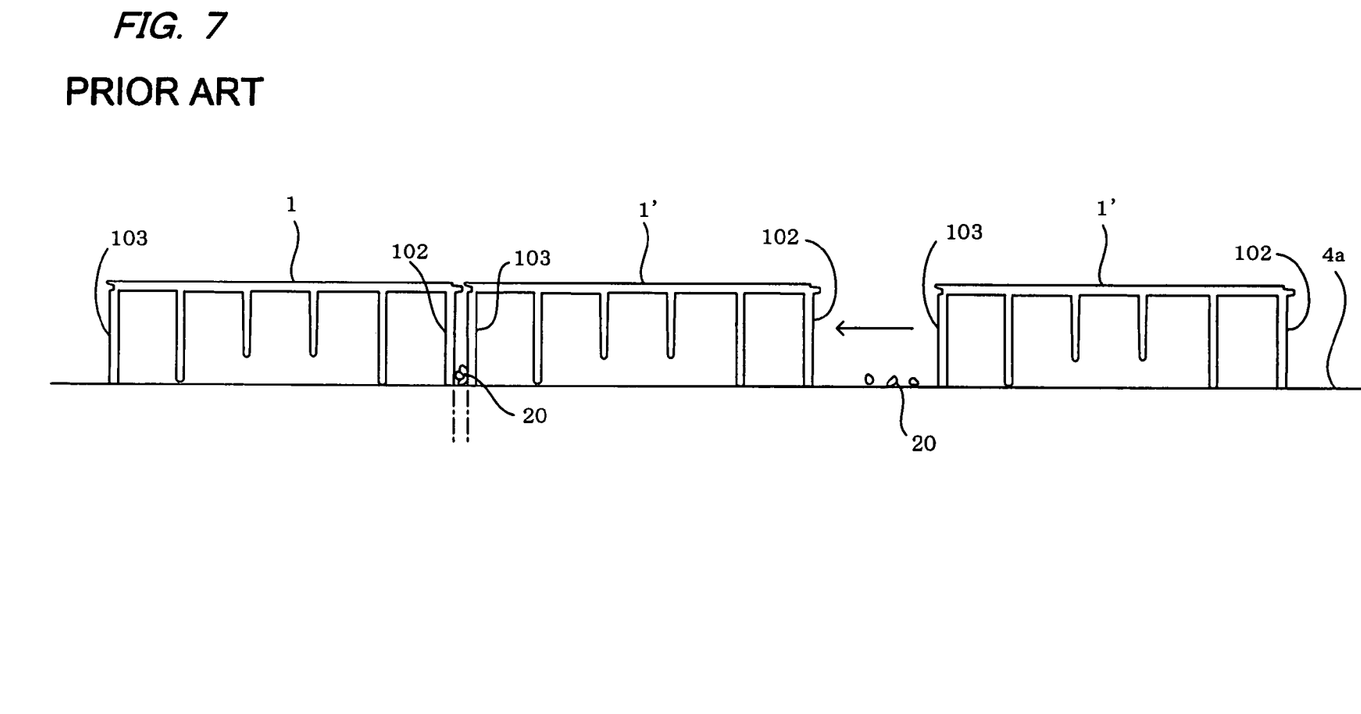
FIG. 7 is an explanatory diagram showing how waste is caught on the bottom of the existing pipe when the segments are coupled in the longitudinal direction in the conventional method.

In the construction work of laying the rehabilitating pipe, it is common to position the rehabilitating pipe so that the outer circumference of a lower end part thereof contacts the bottom of the existing pipe. Consequently, particularly in the case of ring assembly, a segment 1' is moved, as shown in FIG. 7, so that the outer circumference of the lower end part thereof rubs against the pipe bottom 4a of the existing pipe when it is coupled in the longitudinal direction to a segment 1 that is already coupled to the rehabilitating pipe and lies in contact with a pipe bottom 4a.

The segments 1 and 1' are usually provided with side plates 102 and 103 on both sides in the longitudinal direction, whose outer surface forms a coupling surface and whose outer entire surface is formed planarly. Consequently, as shown in FIG. 7, it is often the case that waste, sand, and the like get caught on the pipe bottom 4a of the existing pipe between the outer surfaces of the mutual side plates 102 and 103 of the segments 1 and 1', thereby creating a gap and making it impossible to mutually tightly seal the outer surfaces of the side plates 102 and 103. In such a case, the waste that has gotten caught must be eliminated, which is unfortunately time consuming, and increases the time it takes to perform the coupling work. This problem is remarkable particularly in the case of ring assembly. In addition, if coupling is performed as is without eliminating the waste that has gotten caught, then the above mentioned outer surfaces will not be mutually tightly sealed, creating the problem wherein the watertightness in the coupling portion in the longitudinal direction can no longer be ensured.

It is therefore an object of the present invention to provide a segment for a rehabilitating pipe enabling the coupling work in the longitudinal direction to be performed more simply and in a shorter period of time and enabling the watertightness of the coupling portion in the longitudinal direction to be improved.

SUMMARY OF THE INVENTION

A segment for a rehabilitating pipe according to the invention is coupled to another segment in the circumferential and longitudinal directions to assemble the rehabilitating pipe for rehabilitating an existing pipe. The segment is provided with a recessed part in a coupling surface in the longitudinal direction to form a gap between the coupling surfaces when the segments are coupled in the longitudinal direction of the rehabilitating pipe. The recessed part is formed at that portion of the segment that is brought into contact with the bottom surface of the existing pipe when the rehabilitating pipe is laid inside the existing pipe.

The recessed part is formed such that the coupling surface is made flexible at the recessed part, and preferably extends in the coupling surface across the entire length of the circumferential direction of the segment. Such a recessed part is preferably formed at both coupling surfaces of the segment in the longitudinal direction of the rehabilitating pipe.

According to the invention, the recessed parts in the coupling surfaces form a gap when the segments are coupled in the longitudinal direction. Therefore, even if waste and the like exists on the bottom of the existing pipe and is caught between the coupling surfaces of the segments, the mutual coupling surfaces can be tightly sealed to one another and the segments can thereby be mutually coupled in the longitudinal direction without eliminating that waste and the like as long as the gap has a space to accommodate the waste. Such an arrangement enables the coupling work in the longitudinal direction to be performed more simply and in a shorter time than conventionally and also improves the watertightness of the coupling portions of the segments in the longitudinal direction.

Further features of the invention, its nature and various advantages will be more apparent from the accompanying drawings and following detailed description of the invention.

DESCRIPTION OF THE PREFERRED EMBODIMENTS

The invention will be described based on the preferred embodiments, referring to the attached drawings.

Figure 1:
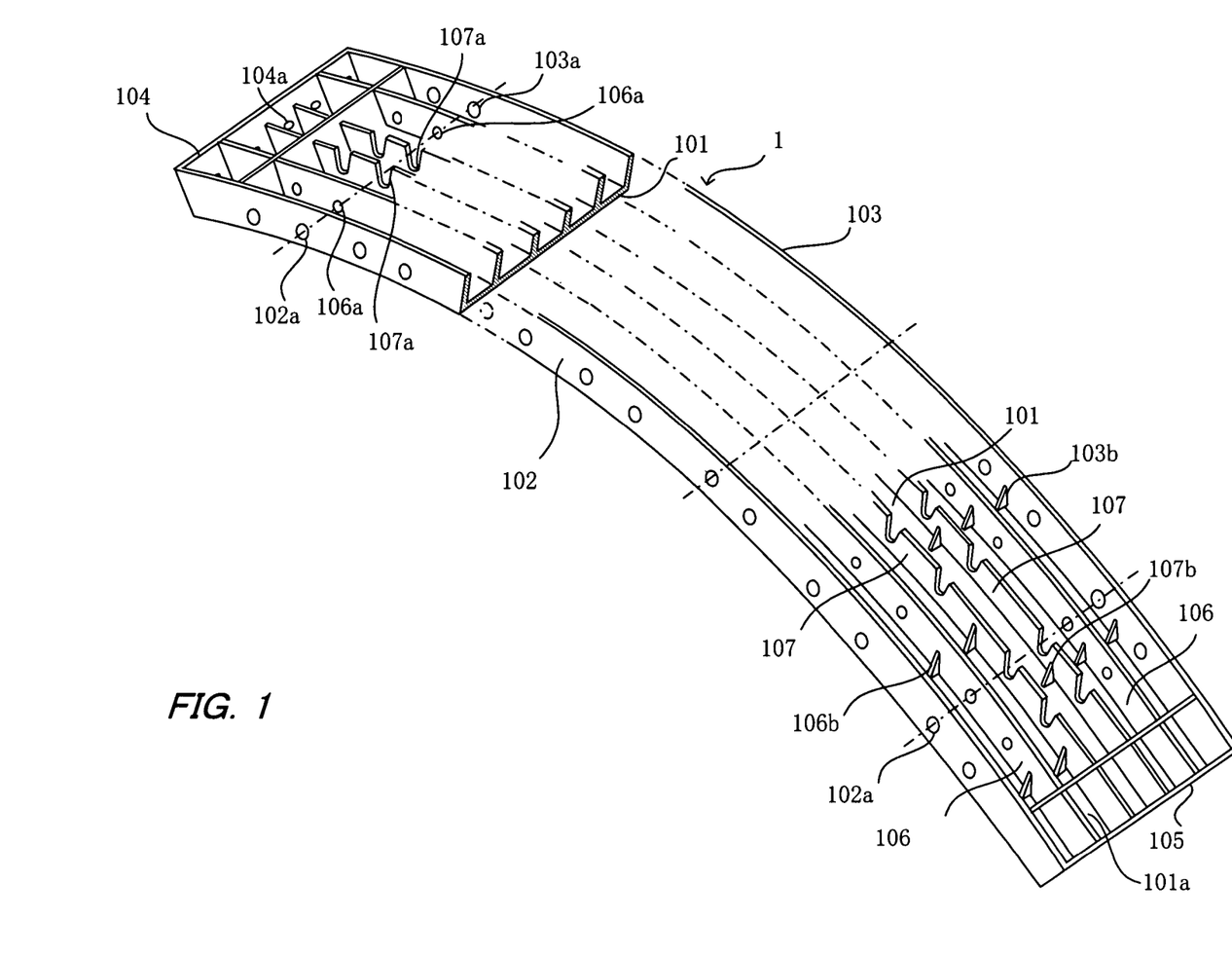
FIG. 1 is a partially broken perspective view showing a segment according to the present invention.

A segment 1 is used to assemble a rehabilitating pipe to rehabilitate an existing pipe, and formed as a unitary block. As shown in FIG. 1, the segment 1 comprises an inner plate 101, side plates 102 and 103, end plates 104 and 105, and respectively two each of reinforcing plates 106 and 107. These plates 101 through 107 are integrally molded to provide a plastic segment using a transparent, semitransparent, or opaque plastic. Vinyl chloride, ABS, DuraStar polymer (trade name), and the like are used as the transparent plastic. PVC, polyethylene, and the like are used as the semitransparent plastic. PVC, polyester, ABS, polyethylene, polypropylene, and the like are used as the opaque plastic.

The inner plate 101 is formed as a plate having a prescribed width and is arcuately curved at a prescribed angle that divides the circumference into a plurality of equal parts, e.g., 72° (five parts). The bottom surface of the inner plate 101 corresponds to the inner circumferential surface of the rehabilitating pipe with the circumferential direction of the arc corresponding to the circumferential direction of the rehabilitating pipe and the latitudinal direction of the arc to the longitudinal direction thereof. A plurality of rectangular openings 101a is formed respectively on both end parts of the inner plate 101 for performing from the inside the work to mutually couple the segments 1 in the circumferential direction.

The side plates 102 and 103 are formed at both side edges across the entire length along the circumferential direction of the inner plate 101, and are provided upright outwardly at a prescribed height on the top surface of the inner plate 101. A plurality of through holes 102a and 103a (herein, 14) is formed in each of the side plates 102 and 103 at a prescribed interval in the circumferential direction for passing therethrough coupling members in the longitudinal direction, as discussed later. In addition, although not shown in FIG. 1, a protruding part (protruding line) 102c and a recessed part (recessed line) 103c, having shapes that substantially conform to one another, are formed at the lower end part of the outer surface of the respective side plates 102 and 103 across the entire lengths thereof, as shown in FIG. 4.

Figure 4:
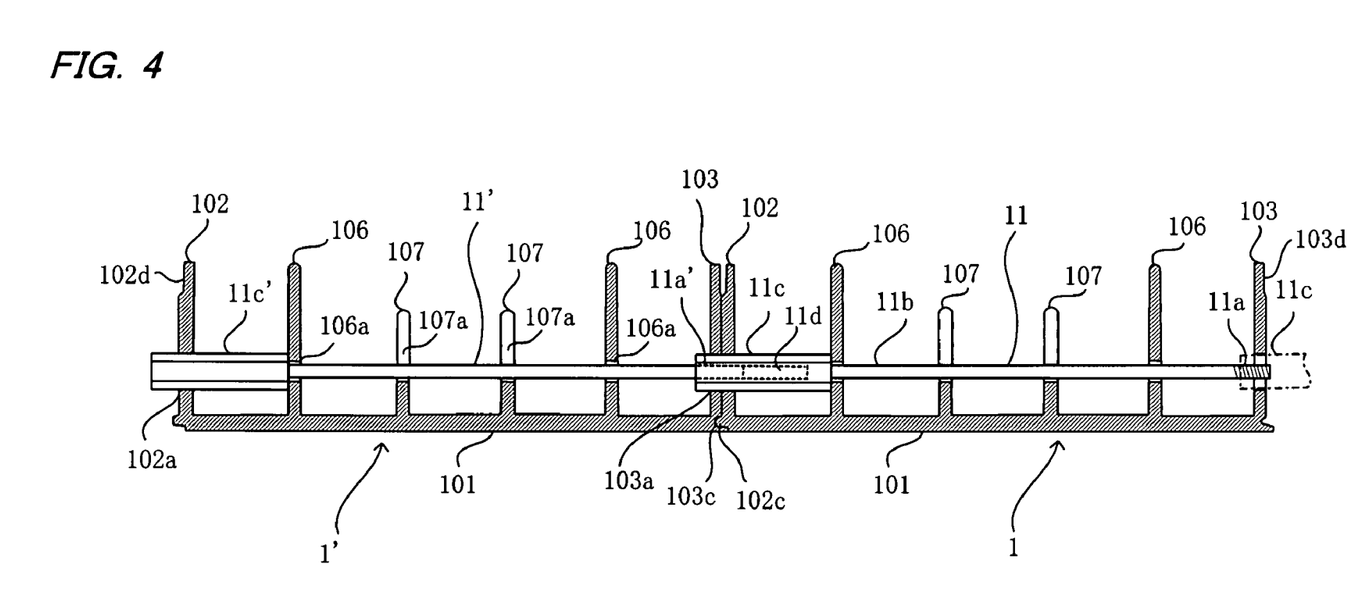
FIG. 4 is a radial cross sectional view showing a state wherein the segments are mutually coupled in the longitudinal direction.
Figure 6:
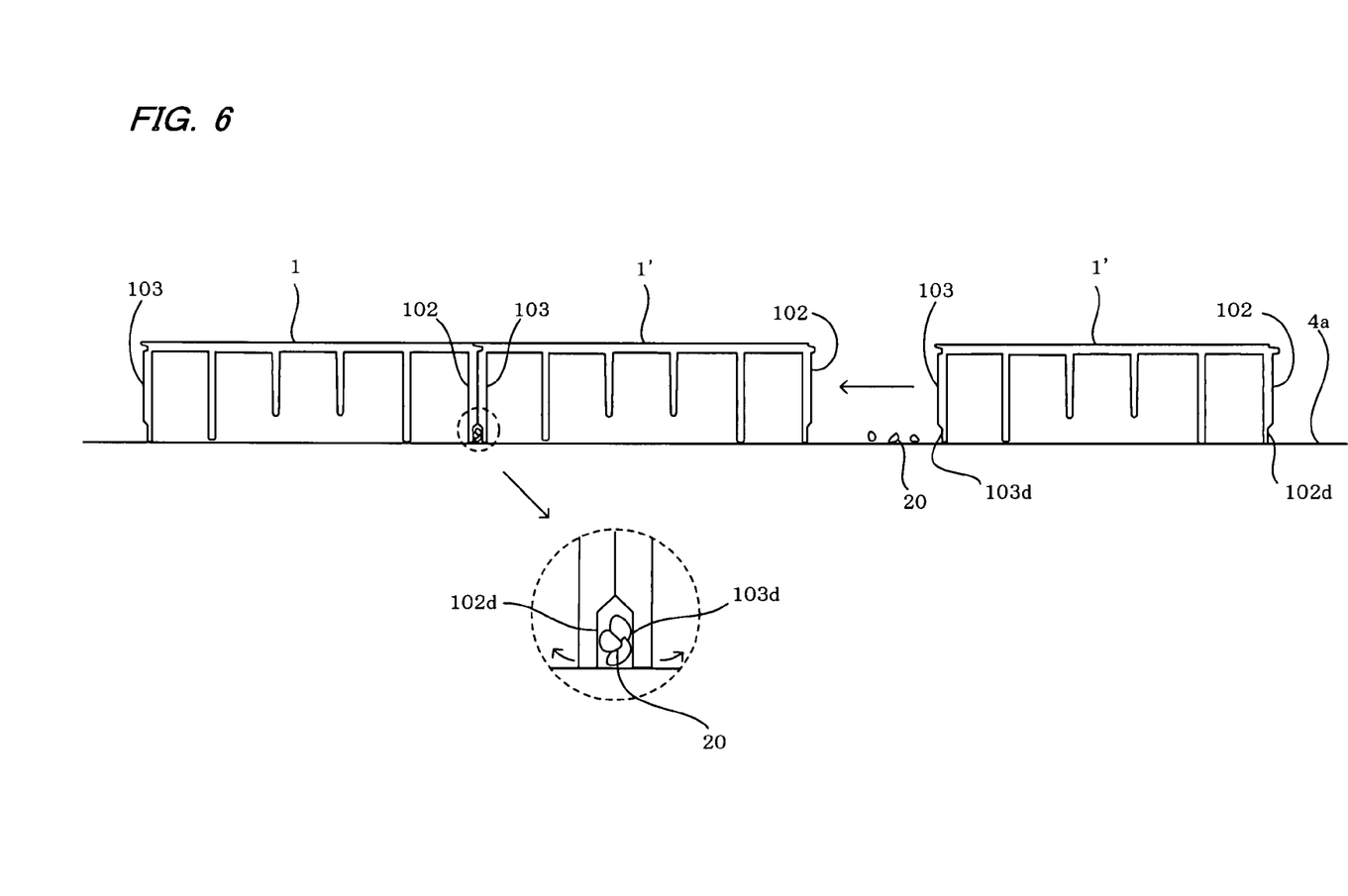
FIG. 6 is an explanatory view showing how waste is caught on the bottom of the existing pipe when the segments are coupled in the longitudinal direction in the invention.

In addition, as shown in FIG. 4 and FIG. 6, in the outer surfaces of the respective side plates 102 and 103 at the outer end parts in the radial direction of the rehabilitating pipe (the upper end part in FIG. 4, and the lower end part in FIG. 6), recessed parts 102d and 103d are formed extending across the entire length of the side plates 102 and 103 along the circumferential direction of the segment 1. The depth of the recessed parts 102d and 103d in the lateral direction in FIG. 4 and FIG. 6 is preferably approximately half the thickness of the side plates 102 and 103, e.g., a depth of approximately 3 mm for a side plate of a thickness of approximately 6 mm; and the dimension in the vertical direction in FIG. 4 and FIG. 6 is preferably, for example, approximately 10 mm or greater. However, it will be understood that the present invention is not particularly limited to these dimensions.

Figure 3:
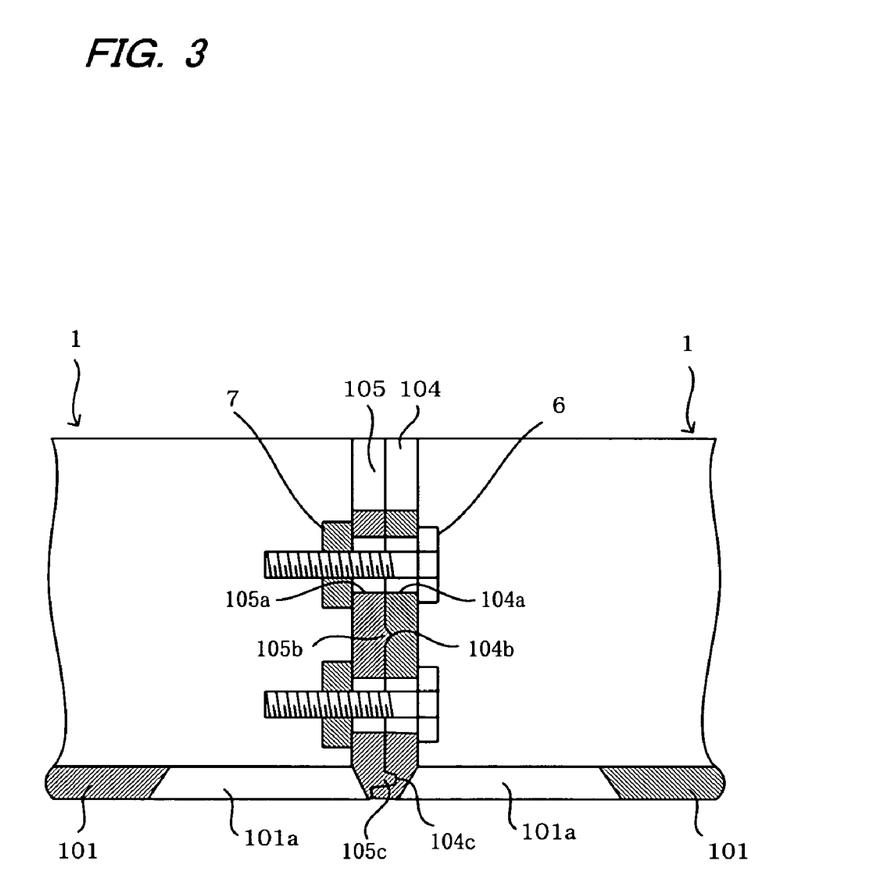
FIG. 3 is a longitudinal cross sectional view showing a state wherein the segments are mutually coupled in the circumferential direction.

The end plates 104 and 105 are formed at both end edges of the inner plate 101 across the entire length along the longitudinal direction thereof, and are provided upright outwardly on the top surface of the inner plate 101 at a height the same as each of the side plates. Through holes 104a and 105a are formed at a plurality of locations in the end plates 104 and 105 for passing therethrough bolts that mutually couple the segments 1 in the circumferential direction (refer also to FIG. 3). In addition, although not shown in FIG. 1, recessed parts 104b and 104c and protruding parts 105b and 105c, having shapes that substantially conform to one another, are formed at the middle part and the lower end part of the outer surfaces of the respective end plates 104 and 105 across the entire length thereof, as shown in FIG. 3.

The reinforcing plates 106 and 107 reinforce the mechanical strength of the entire segment 1, and are provided upright at a prescribed height outwardly on the inner plate 101 on the inner sides of the side plates 102 and 103. In the reinforcing plates 106 and 107 are formed a plurality of through holes 106a and notched parts 107a for inserting therethrough the coupling members in the longitudinal direction at a position corresponding respectively to the through holes 102a and 103a of the side plates 102 and 103.

In addition, laterally projecting, small, right triangular protruding plates 103b, 106b and 107b (the protruding plates of the side plate 102 are not shown) are formed at a plurality of locations on the inside surfaces of the side plates 102 and 103 and both side surfaces of the reinforcing plates 106 and 107 to prevent deformation respectively thereof, thereby forming a rib structure that enhances the strength of the segment 1.

When the existing pipe to be repaired is circular in cross sectional shape, the segment 1 corresponds to one block obtained when a circular pipe with outer and inner circumference curvatures respectively adapted to that of the existing pipe is cut off in slices at a prescribed width and the thus sliced pipe is divided for segmentation in the circumferential direction into parts (preferably into equal parts).

The number of reinforcing plates or the number of protruding plates can be varied in accordance with the required strength of the segment; if strong, then some or all can be omitted. In addition, the segment functions as a rehabilitating or repairing unit, so that it is not limited to an arcuate type or fan type as shown in FIG. 1, and can be made a parallelepiped in accordance with the cross sectional shape or size of the existing pipe or the repair location of the existing pipe, and can also be made a shape bent into a rounded right angle.

The segments are successively coupled in the circumferential direction with the outer surfaces of every end plate of each segment mutually aligned and also the inner surfaces of every inner plate thereof mutually aligned. The segments are also successively coupled in the longitudinal direction so that the outer surfaces of every side plate of each segment are mutually aligned and the inner surfaces of each inner plate are mutually aligned. Such processes allow a rehabilitating pipe to be assembled with the inner entire surface thereof being uniform without any gap between the segments.

The following explains the details of a method for laying a rehabilitating pipe inside an existing pipe using the segments.

Figure 2:
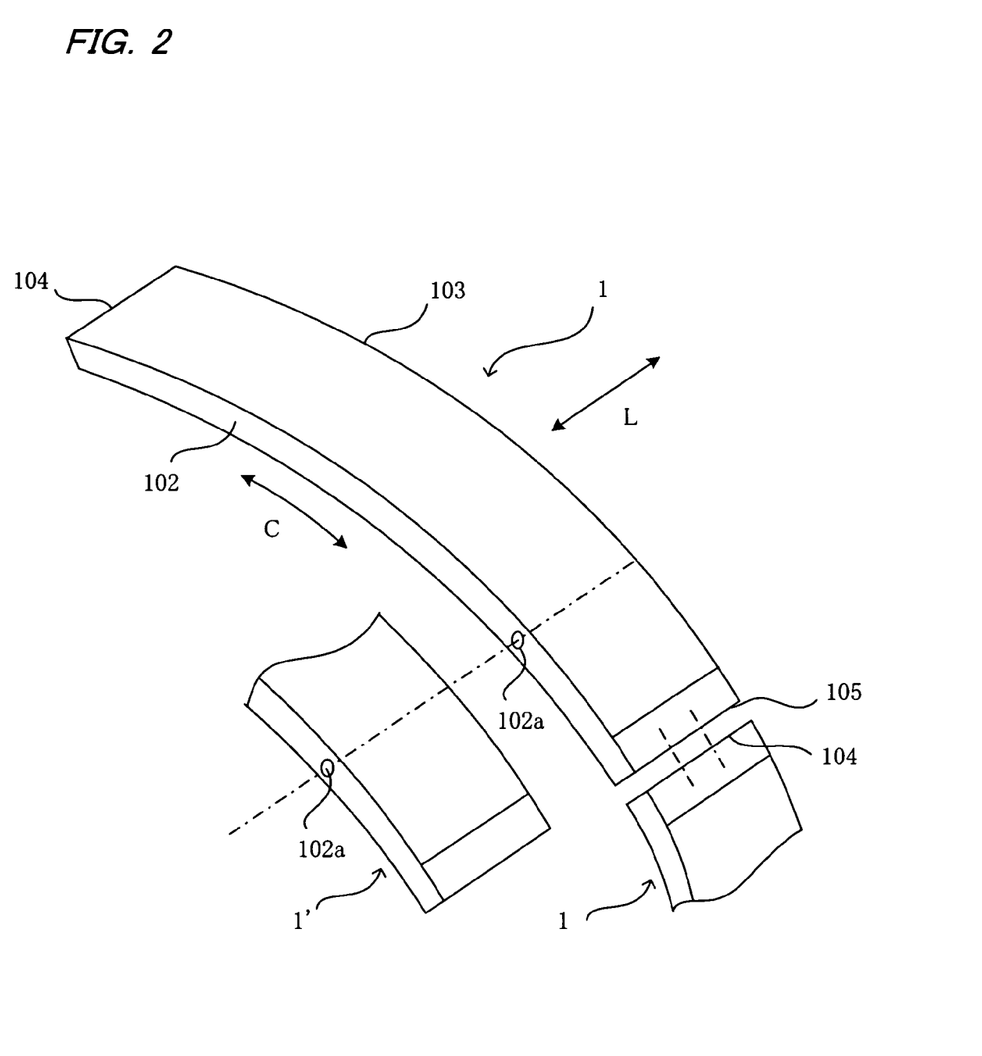
FIG. 2 is a perspective view showing how the segments are coupled in the circumferential direction and in the longitudinal direction.

First, the segments 1 are carried inside the existing pipe, and successively coupled in the circumferential direction, as shown in FIG. 2. This coupling is performed, as shown in detail in FIG. 3, by interfitting the recessed parts 104b and 104c and the protruding parts 105b and 105c of all the segments 1 to position the inner surfaces of all the inner plates 101 so that they form the same surface and to position the outer surfaces of all the side plates 102 so that they form the same surface and the outer surfaces of all the side plates 103 so that they form the same surface; mutually, tightly sealing the outer surfaces of the end plates 104 and 105 of all the segments 1; inserting bolts 6 into the through holes 104a and 105a from the opening 101a of the inner plate 101; screwing on nuts 7; and tightening both end plates 104 and 105. By coating the interfitted recessed parts 104b and 104c with a sealing material (not shown) prior to this coupling, the watertightness of the coupled part can be enhanced. When the coupling is completed, a cover (not shown) and the like tightly seals each opening 101a. At this time, the inner surface of the cover is continuous with the inner surface of each inner plate, thus forming a uniform inner surface.

After the segments are coupled so as to form a ring shape or after a prescribed number of segments are coupled in the circumferential direction C, another segment 1' is coupled in the longitudinal direction L to the segment already coupled in the circumferential direction, as shown in FIG. 2.

The coupling in the longitudinal direction is performed, as shown in FIG. 4, by using a rod shaped coupling member 11 made of metal and that integrally joins a rod 11b with one end thereof formed as a screw part 11a, and the other end as a nut part 11c. A screw hole 11d is formed in the nut part 11c to receive the screw part 11a of the rod of another coupling member.

In FIG. 4, the coupling member 11 on the right side is already joined to the nut part 11c of another coupling member, shown by the chain line, and fixed to the segment 1. To couple another segment 1' to this segment 1, both segments 1 and 1' are first positioned so that the inner surfaces of the inner plates 101 thereof align and form a uniform surface. The outer surfaces of the side plates 102 and 103 of both the segments are then brought into tightly contact with each other with the nut part 11c protruding from the side plate 102 of the segment 1 interfitted with a through hole 103a of the side plate 103 of the segment 1' and with the protruding part 102c of the segment 1 interfitted with the recessed part 103c of the segment member 1'. In this case, by coating the recessed part 103c with a sealing material (not shown) beforehand, watertightness can be enhanced.

A coupling member 11' is then inserted through from the through hole 102a of the side plate 102 of the segment 1', and the screw part 11a' thereof is screwed into the screw hole 11d of the nut part 11c of the coupling member 11. At this time, the screw part 11a' and a rod 1b' are inserted from the through hole 102a through the through hole 106a, two notched parts 107a, and the through hole 106a, and screwed in.

When the screw part 11a' is screwed into the screw hole 11d until a nut part 11c of the coupling member 11' hits against the reinforcing plate 106 of the segment 1', the coupling member 11' clamps the segment 1' against the segment 1 to thereby couple both segments 1 and 1'. Because the coupling of every segment is performed using, for example, four coupling members per segment, both segments 1 and 1' are coupled rigidly in the longitudinal direction.

When the segment 1 in FIG. 4 is the initial segment in the longitudinal direction, the coupling member as shown in FIG. 4 cannot be used, and therefore a fixing member having a structure the same as the nut part 11c that can fix the segment 1 is used as the coupling member.

During assembly in the longitudinal direction, as shown in FIG. 6, the segment 1' to be coupled is moved toward the segments that are coupled as a ring and lie in contact with the pipe bottom 4a of the existing pipe, so that the outer circumference of its lower end part of the segment 1' rubs against the pipe bottom 4a of the existing pipe. In this situation, if waste 20 is present on the pipe bottom 4a, then the waste is pressed to the side plate 103 of the segment 1', and is caught between the outer surfaces of the lower end parts of the side plates 102 and 103 of the segments 1 and 1'.

However, the side plates 102 and 103 are provided with the recessed parts 102d and 103d at the lower end parts of the outer surfaces thereof, so that a gap is formed between the side plates 102 and 103 when both the segments 1 and 1' are mutually coupled in the longitudinal direction. The gap thus formed can accommodate the waste 20, even if the waste is not removed, as long as it is not a large amount, or its particles are not large, as shown on an enlarged scale in FIG. 6.

Furthermore, the recessed parts 102d and 103d make the lower end parts of the side plates 102 and 103 thin walled, so that they are elastically deformable in the longitudinal direction. Consequently, if the amount of waste 20 that is caught is large, or if the particles of the waste 20 are large, then this can be handled to some extent because the lower end parts of the side plates 102 and 103 are pressed by the waste 20, and elastically deform in one direction of the longitudinal direction and the reverse direction thereof so that they become mutually spaced apart, as shown by the arrow in the enlarged view on the lower side of FIG. 6, thereby enlarging the space of the gap that can accommodate the waste. Thus, even if waste is caught to some extent, the outer surfaces of the side plates 102 and 103 can be mutually tightly sealed, and the segments 1 and 1' can be mutually coupled in the longitudinal direction.

As described above, the rehabilitating pipe 3 can be assemble and laid, as shown in FIG. 5, by successively and mutually coupling segments 1 in the circumferential direction and the longitudinal direction inside the existing pipe 4. After completion of the pipe laying, the gap between the existing pipe 4 and each of the segments 1 of the rehabilitating pipe 3 is filled with grout (not shown), which is hardened to integrate with the existing pipe 4 as a compound pipe. The coupled segments 1 are schematically depicted in FIG. 5 as a simple block shape, and only one reinforcing plate is shown for the segments 1. In FIG. 5 the coupling members 11 are also illustrated with some of them depicted by dashed lines. Furthermore, although all of the segments 1 in FIG. 5 are coupled with their end plates aligned in the longitudinal direction, they can also be coupled with their end plate positions offset. In addition, it is understood that the number of coupling members 11 inserted per segment 1 is not limited to four.

In the above embodiment, the segments are successively coupled at only one side of the existing pipe in the longitudinal direction (single sided coupling), but it is also possible to successively couple the segments at both sides in the longitudinal direction (bilateral coupling). In this case, the pipe laying time can be reduced because the segments can be coupled from both sides.

Furthermore, in the embodiment explained above, the segments are used for a circular rehabilitating pipe assembly; however, a segment according to the invention can also be used for assembly of a rehabilitating pipe whose cross-sectional shape is, e.g., a rectangular shape, a U shape, a semicircular shape, and the like.

What is claimed is:

1. A segment that is coupled to another segment in circumferential and longitudinal directions thereof while the segments are disposed inside of an existing pipe to assemble a rehabilitating pipe for rehabilitating the existing pipe, each of the coupled segments comprising: at least one coupling surface provided with a recessed part that confronts the recessed part at the coupling surface of the segment to which it is coupled to form therebetween a gap that is configured to receive and hold waste material existing at a bottom surface of the existing pipe when the rehabilitating pipe is assembled inside of the existing pipe.

2. A segment for a rehabilitating pipe according to claim 1; wherein for each segment the recessed part is formed at a portion of the segment which is brought into contact with the bottom surface of the existing pipe when the assembled rehabilitating pipe is laid inside of the existing pipe.

3. A segment for a rehabilitating pipe according to claim 2; wherein for each segment the recessed part is formed such that the coupling surface is made flexible at the recessed part.

4. A segment for a rehabilitating pipe according to claim 1; wherein for each segment the recessed part extends in the coupling surface across an entire length of the circumferential direction of the segment.

5. A segment for a rehabilitating pipe according to claim 1; wherein for each of the segments, the at least one coupling surface comprises a pair of coupling surfaces disposed at opposite ends of the segment in the longitudinal direction thereof.

6. A segment for a rehabilitating pipe according to claim 1; wherein each segment has a side plate having the coupling surface provided with the recessed part; and wherein for each segment, a depth of the recessed part in a lateral direction thereof is approximately one-half a thickness of the side plate.

7. A segment for a rehabilitating pipe according to claim 1; wherein each segment has a side plate including an end part having the coupling surface provided with the recessed part; and wherein for each segment the end part of the side plate is elastically deformable in a longitudinal direction of the segment so that the gap formed between the coupling surfaces of the coupled segments receives and holds the waste material existing at the bottom of the existing pipe by the end part undergoing elastic deformation in the longitudinal direction.

8. A rehabilitating pipe that is assembled inside of an existing pipe to rehabilitate the existing pipe, the rehabilitating pipe comprising: a plurality of segments coupled to one another in circumferential and longitudinal directions at coupling surfaces thereof to form the rehabilitating pipe, each of the segments having at least one coupling surface in the longitudinal direction provided with a recessed part that forms a gap with the recessed part of another of the segments to which it is coupled, the gap being configured to receive and hold waste material existing at a bottom surface of the existing pipe when the rehabilitating pipe is assembled inside of the existing pipe.

9. A rehabilitating pipe according to claim 8; wherein for each segment the recessed part is formed at a portion of the segment which is brought into contact with the bottom surface of the existing pipe when the assembled rehabilitating pipe is laid inside of the existing pipe.

10. A rehabilitating pipe according to claim 9; wherein for each segment the recessed part is formed such that the coupling surface is made flexible at the recessed part.

11. A rehabilitating pipe according to claim 8; wherein for each segment the recessed part extends in the coupling surface across an entire length of the circumferential direction of the segment.

12. A rehabilitating pipe according to claim 8; wherein for each segment the at least one coupling surface comprises a pair of coupling surfaces disposed at opposite ends of the segment in the longitudinal direction thereof.

13. A rehabilitating pipe according to claim 8; wherein each segment has a side plate having the coupling surface provided with the recessed part; and wherein for each segment, a depth of the recessed part in a lateral direction thereof is approximately one-half a thickness of the side plate.

14. A rehabilitating pipe according to claim 8; wherein each segment has a side plate including an end part having the coupling surface provided with the recessed part; and wherein for each segment the end part of the side plate is elastically deformable in a longitudinal direction of the segment so that the gap formed between the coupling surfaces of the coupled segments receives and holds the waste material existing at the bottom of the existing pipe by the end part undergoing elastic deformation in the longitudinal direction.

15. A rehabilitating pipe that is assembled inside of an existing pipe to rehabilitate the existing pipe, the rehabilitating pipe comprising:
 a plurality of segments coupled to one another in circumferential and longitudinal directions at coupling surfaces thereof to form the rehabilitating pipe; and
 means defining a gap between each pair of coupled segments for receiving and holding waste material existing in the existing pipe during assembly of the rehabilitating inside of the existing pipe.

16. A rehabilitating pipe according to claim 15; wherein the segments are coupled at coupling surfaces thereof; and wherein the means defining a gap comprises a recessed part formed at each of the coupling surfaces of the segments.

17. A rehabilitating pipe according to claim 16; wherein each segment has a side plate including an end part having the coupling surface provided with the recessed part; and wherein for each segment the end part of the side plate is elastically deformable in a longitudinal direction of the segment so that the gap formed between the pair of coupled segments receives and holds the waste material by the end part undergoing elastic deformation in the longitudinal direction.

18. A rehabilitating pipe according to claim 16; wherein for each segment the recessed part is formed at a portion of the segment which is brought into contact with a bottom surface of the existing pipe when the assembled rehabilitating pipe is laid inside of the existing pipe.

19. A rehabilitating pipe according to claim 16; wherein for each segment the recessed part extends in the coupling surface across an entire length of the circumferential direction of the segment.

20. A rehabilitating pipe according to claim 16; wherein each segment has a side plate having the coupling surface provided with the recessed part; and wherein for each segment, a depth of the recessed part in a lateral direction thereof is approximately one-half a thickness of the side plate.

* * * * *